US006967657B2

(12) United States Patent
Lowles et al.

(10) Patent No.: US 6,967,657 B2

(45) Date of Patent: Nov. 22, 2005

(54) LIGHT SOURCE SYSTEM FOR A COLOR FLAT PANEL DISPLAY

(75) Inventors: Robert J. Lowles, Waterloo (CA); James A. Robinson, Elmira (CA)

(73) Assignee: Research In Motion Limited, Waterloo (CA)

(*) Notice: Subject to any disclaimer, the term of this patent is extended or adjusted under 35 U.S.C. 154(b) by 548 days.

(21) Appl. No.: 10/146,075

(22) Filed: May 15, 2002

(65) Prior Publication Data

US 2002/0171618 A1 Nov. 21, 2002

Related U.S. Application Data

(60) Provisional application No. 60/291,216, filed on May 15, 2001.

(51) Int. Cl.[7] .......................... G09G 5/26; G06T 11/00

(52) U.S. Cl. ...................... 345/472; 345/102; 455/574

(58) Field of Search ................. 345/87–102, 690–691, 345/211, 471, 472, 472.1, 472.2; 455/556.1, 455/556.2, 566, 574; H04M 1/00; G09G 3/36, G09G 5/10; G06T 11/00

(56) References Cited

U.S. PATENT DOCUMENTS

| | | | | |
|---|---|---|---|---|
| 4,637,687 | A * | 1/1987 | Haim et al. | 349/81 |
| 5,920,367 | A * | 7/1999 | Kajimoto et al. | 349/162 |
| 6,501,521 | B2 * | 12/2002 | Matsushita et al. | 349/106 |
| 6,600,470 | B1 * | 7/2003 | Tsuda | 345/89 |
| 2001/0052948 | A1 * | 12/2001 | Okamoto et al. | 349/12 |

* cited by examiner

*Primary Examiner*—Alexander Eisen

(74) *Attorney, Agent, or Firm*—Jones Day; Krishna K. Pathiyal; Robert C. Liang

(57) ABSTRACT

A system for operating a color flat panel display (FPD) is provided that includes a color FPD, a rear light source, and a display processing device. The color FPD has an adjustable color depth and is configured to reflect ambient light. The light source transmits light through the bottom surface of the color FPD. The display processing device is coupled to the color FPD and decreases the color depth of the color FPD when the EL light source is activated and increases the color depth of the color FPD when the EL light source is turned off. The color flat panel display is configured to allow more reflection of ambient light than transmission of light emitted from the light source.

51 Claims, 3 Drawing Sheets

LIGHT SOURCE SYSTEM FOR A COLOR FLAT PANEL DISPLAY

CROSS-REFERENCE TO RELATED APPLICATION

This application claims priority from and is related to the following prior application: Light Source For A Colour LCD, U.S. Provisional Application No. 60/291,216, filed May 15, 2001. This prior application, including the entire written description and drawing figures, is hereby incorporated into the present application by reference.

FIELD OF THE INVENTION

This invention relates generally to a color flat panel display (FPD). More particularly, a light source system for a color FPD is provided.

BACKGROUND OF THE INVENTION

Color FPDs having integral light sources are known as FPD modules. Specifically, there are three general categories of color FPDs: reflective color FPDs, transmissive color FPDs, and transreflective color FPDs.

Reflective color FPDs typically require a front light source or front light pipe in order to be viewed in low-light conditions. Such front light sources, however, typically decrease the overall reflection of the FPD, thus causing the FPD to appear "washed out." In addition, such light sources add to the overall thickness of the FPD module, again making them non-ideal for use in small electronic devices, such as mobile devices.

Transmissive color FPDs typically require a rear light source, which remains continuously on while the FPD is in use. Transmissive color FPD modules thus consume relatively large amounts of power and add a significant amount of overall thickness to the FPD module. Moreover, transmissive color FPD modules are typically difficult to read in strong ambient lighting conditions, such as sunlight.

Transreflective color FPDs combine the performance of reflective and transmissive displays. They can reflect ambient light as well as transmit light from a rear light source. Transreflective color FPDs similarly require a rear light source. The rear light source in a transreflective color FPD module, however, is typically only turned on in low-light conditions. Nonetheless, the rear light source in a transreflective color FPD module adds to the overall thickness of the FPD module.

It is also known to use an electroluminescent (EL) light source with a monochrome FPD. In comparison to the light sources typically used for color FPDs, an EL light source is thin, inexpensive.

A transreflective FPD module with low light emission characteristics is generally considered difficult to view in low light conditions, but is generally acceptable with moderate ambient lighting conditions.

SUMMARY

A system for operating a color flat panel display (FPD) is provided that includes a color FPD, a rear light source, and a display processing device. The color FPD has an adjustable color depth and is configured to reflect ambient light. The light source transmits light through the bottom surface of the color FPD. The display processing device is coupled to the color FPD and decreases the color depth of the color FPD when the EL light source is activated and increases the color depth of the color FPD when the EL light source is turned off. The color flat panel display is configured to allow more reflection of ambient light than transmission of light emitted from the light source. The system provides a transreflective FPD with an improved viewing performance under low-lighting conditions while approaching the advantages of a reflective FPD.

DETAILED DESCRIPTION

Figure 1:
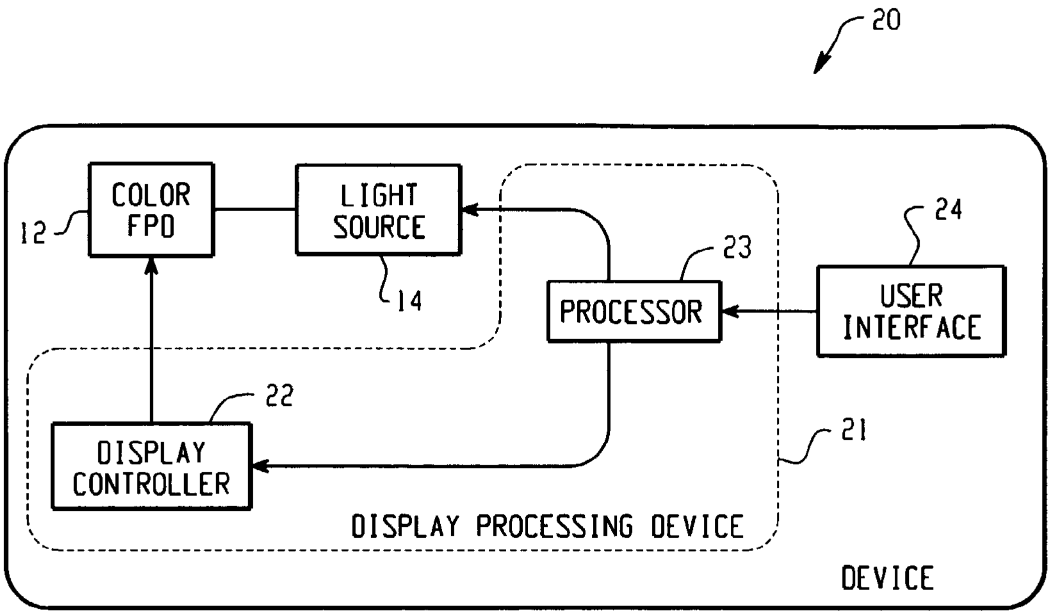
FIG. 1 is a block diagram of an exemplary device that includes a system for controlling a color FPD having a light source.

Referring now to the drawing figures, FIG. 1 is a block diagram of an exemplary device 20 that includes a system for controlling a color FPD 12 having a light source 14. The color FPD is biased to reflect more ambient light than to transmit light from the light source 14. The device 20 includes the color FPD 12 having the light source 14, a display processing device 21, and a user interface 24. The user interface 24 may, for example, be a sub-system on the device 20 that includes user input devices such as QWERTY keypad, a thumb-wheel, a stylus pad, and/or a touchscreen. The display processing device 21 includes a display controller 22 and a processor 23. The processor 23 may execute a software module that manages the display controller 22, or in the absence of a controller 22, the processor 23 manages the FPD directly. It should be understood that in addition to the system components illustrated in FIG. 1, the device 20 may include other system components and sub-systems.

The user interface 24 is coupled to the light source 14 so that the light source 14 may be activated for viewing under low-light conditions. When the light source 14 is activated, the controller 22 signals the color FPD module 12 to decrease the color depth to substantially monochrome. In an alternative embodiment, the the color depth is reduced to a smaller set of colors, for example, from a full color depth of thousands or millions of colors to a color depth of 8 colors. In addition, when the light source 14 is active, the displayed font size may be increased from a first font size to a larger second font size in order further improve readability in low-light conditions. Then, when ambient light conditions improve, the device user may use the interface 24 to deactivate the light source 14. When the light source 14 is deactivated, the displayed font size and color depth are returned to their original settings.

The user interface 24 may also enable the device user to selectively adjust the color depth of the FPD module 12 to a preferred setting. The color depth may be adjusted, for example, while the FPD module 12 is in reflective mode, low-light mode, or when the user initially sets up the device parameters. Similarly, the user interface 24 may enable the device user to selectively change the font size of the FPD module 12. In one alternative embodiment, the user interface 24 may enable the device user to turn the light source 14 on, and then independently provide the user the options to increase the font size and/or reduce the color depth of the FPD module 12 to substantially monochrome.

Figure 2:
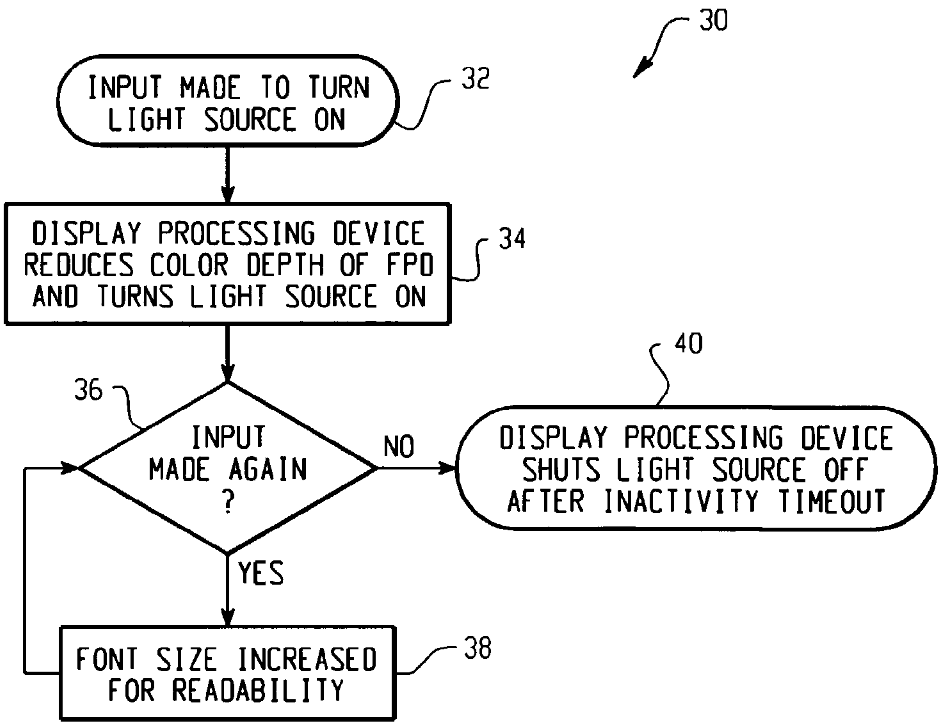
FIG. 2 is a flow diagram of a exemplary method for controlling a color FPD having a light source.

FIG. 2 is a flow diagram of an exemplary method 30 for controlling a color FPD having a light source. In step 32, a user makes a pre-selected input, for example using the user interface sub-system 24 described above, which turns on the light source attached to the FPD. The pre-selected input may, for example, be an icon on the device, a dedicated key on the device, or some other type of user input associated with activating the light source. After the light source has been activated, the color depth of the FPD is reduced to monochrome in step 34, for example using the FPD controller 22 described above.

In step 36, the device monitors the system for input from the user. If a second occurrence of the pre-selected user input associated with activating the light source is detected at step 36, then the device increases the font size of the FPD from a first font size to a larger second font size in step 38 in order to further improve readability on the FPD. In addition, the device may further increase the font size of the FPD to a third font size larger than the second and first font sizes with a successive occurrence of the pre-selected input. With each successive occurrence of the pre-selected input the font size may further increase. The device then remains in this low-light mode, where the light source 14 is activated, (step 36) until a pre-determined period has passed without the detection of any user input (either the pre-selected input or some arbitrary input). After the pre-determined period of inactivity, the device automatically shuts off the light source, adjusts the display from monochrome to full color and decreases the font size to the first font size in step 40. In addition, the light source may also be shut off by some specific input by the user indicating that the user desires to return the FPD to its normal reflective mode of operation.

Figure 3:
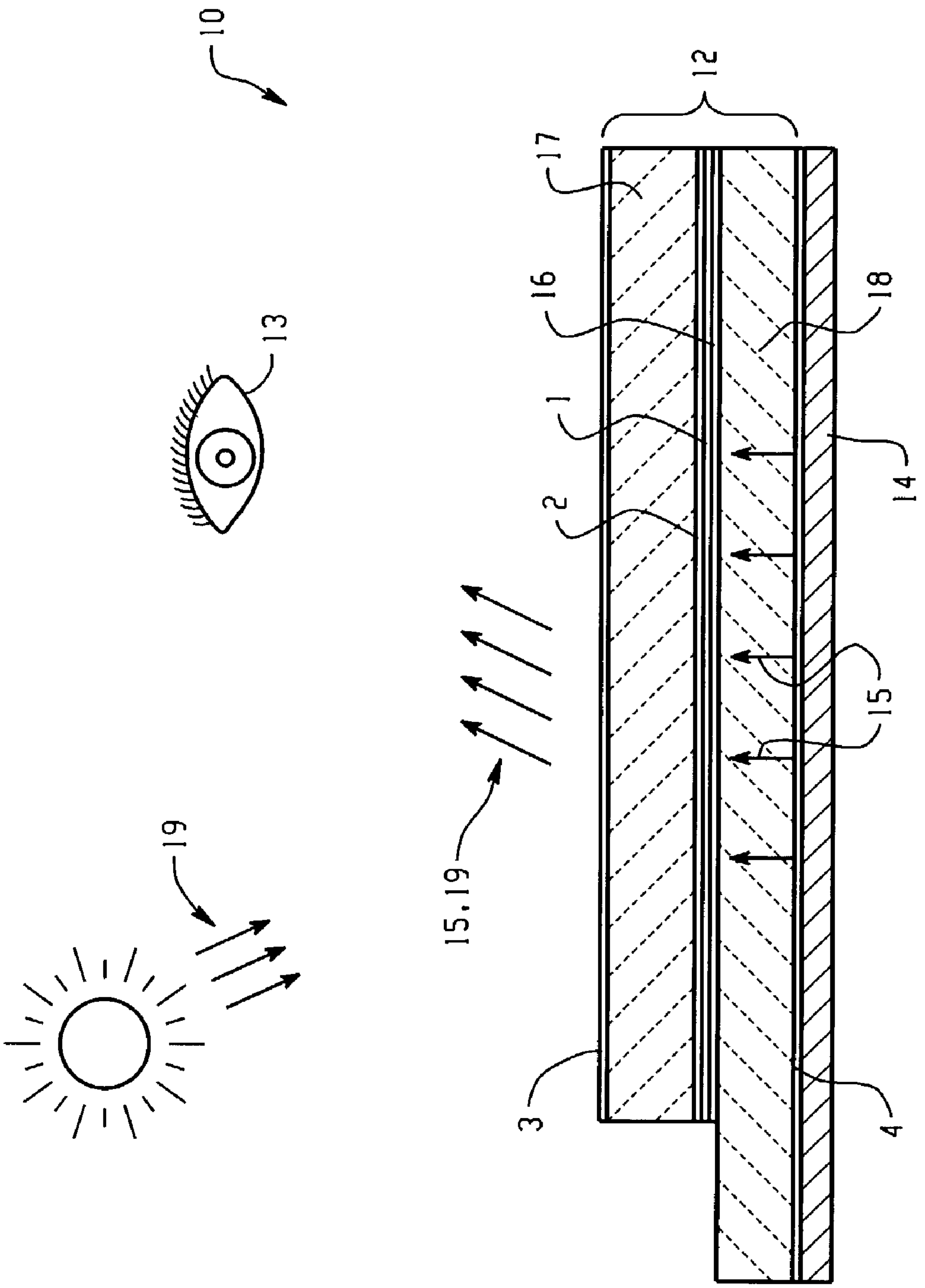
FIG. 3 is a cross-sectional view of an exemplary color liquid crystal display (LCD) having an electroluminescent light source.

FIG. 3 is a cross-sectional view of an exemplary color flat panel display (FPD) with a rear light source. FIG. 3 shows a color liquid crystal display (LCD) 12 having an electroluminescent (EL) light source 14. The color LCD 12 includes an upper transparent plate 17 and a lower transparent plate 18. A front polarizer 3 is attached to the top of the upper transparent plate 17 and a rear polarizer is attached to the bottom of the lower transparent plate 18. Attached to the bottom of the upper transparent plate 17 is a color filter 2, and attached to the top of the lower transparent plate 18 is a reflector 16. A layer of liquid crystal 1 resides between the color filter 2 and the reflector 16. In addition, the EL light source 14 is attached to a bottom surface of the lower transparent plate 18 of the LCD 12. When activated, the EL light source 14 emits light 15 from a surface adjacent to the bottom surface of the lower transparent plate 18. The reflector 16 is configured to transmit the light 15 emitted from the EL light source 14, and to reflect ambient light 19 entering the LCD 12 through the upper transparent plate 17. The transparent plates 17, 18 of the LCD 12 may, for example, be composed of any suitable transparent or translucent material, such as plastic or glass.

When there is sufficient ambient light 19, the LCD 12 may operate in reflective mode, where the light source 14 is deactivated. In reflective mode, ambient light 19 is then reflected off the reflector 16 to be viewed by a device user 13. The liquid crystal 1 is driven, typically by a controller, to display different colors through the color filter 2 at different pixel locations on the LCD 12 and hence to display an image to a user.

When the ambient light 19 is insufficient to comfortably view the LCD 12 in reflective mode, the EL light source 14 may be activated to operate the LCD 12 in a low-light mode. When activated, the EL light source 14 radiates light 15 that is transmitted through the LCD 12. In order to optimize performance of the LCD 12 in low-light mode, the reflector 16 may be configured to allow for more reflection of ambient light 19 than transmission of light 15 from the EL light source 14. In addition, to compensate for diminished aesthetics caused by the low intensity light typically emitted by an EL light source 14, the LCD 2, driven by the controller, changes the color depth of the LCD 12 to monochrome when the EL light 14 is activated. The controller decreases the number of signals across the LCD 12 to decrease the number of colors that are visible. In addition, a first font size displayed by the LCD 12 may be increased to a second font size while the EL light 14 is activated to further assist the device user 13 in viewing the LCD 12.

In an alternative embodiment, the FPD may be an inherently reflective display with very low transmission, such as digital paper. A thin, dim, rear light source could be employed to keep the overall display module thin. The techniques of decreasing color depth and increasing font size of the display when the light source is activated could be employed to improve readability in a dark environment.

Figure 4:
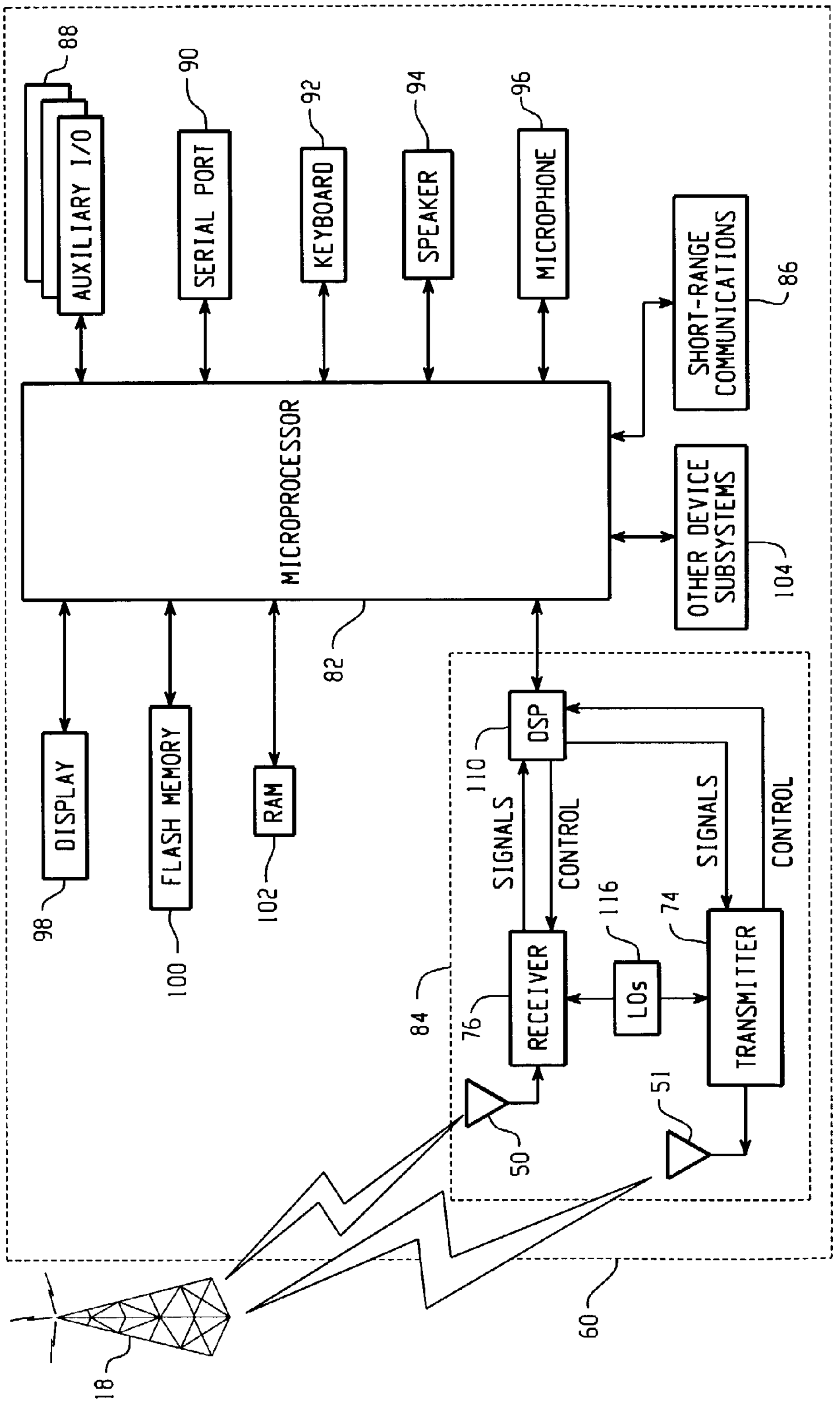
FIG. 4 is a more detailed block diagram of the mobile device shown in FIG. 1.

FIG. 4 is a more detailed block diagram of an exemplary mobile device shown in FIG. 2 using a FPD such as the LCD show in FIG. 3. The mobile device 20 includes a processing device 82, a communications subsystem 84, a short-range communications subsystem 86, input/output devices 88–98, memory devices 100, 102, and various other device subsystems 104. The mobile device 20 is preferably a two-way communication device having voice and data communication capabilities. In addition, the device 20 preferably has the capability to communicate with other computer systems via the Internet.

The processing device 82 controls the overall operation of the mobile device 20. Operating system software executed by the processing device 82 is preferably stored in a persistent store, such as a flash memory 100, but may also be stored in other types of memory devices, such as a read only memory (ROM) or similar storage element. In addition, system software, specific device applications, or parts thereof, may be temporarily loaded into a volatile store, such as a random access memory (RAM) 102. Communication signals received by the mobile device 20 may also be stored to RAM.

The processing device 82, in addition to its operating system functions, enables execution of software applications on the device 20. A predetermined set of applications that control basic device operations, such as data and voice communications, may be installed on the device 20 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 118. Preferably, the PIM data items are seamlessly integrated, synchronized and updated via the wireless network 118 with the device user's corresponding data items stored or associated with a host computer system. An example system and method for accomplishing these steps is disclosed in "System And Method For Pushing Information From A Host System To A Mobile Device Having A Shared Electronic Address," U.S. Pat. No. 6,219,694, which is owned by the assignee of the present application, and which is hereby incorporated into the present application by reference.

Communication functions, including data and voice communications, are performed through the communication subsystem 84, and possibly through the short-range communications subsystem 86. If the mobile device 20 is enabled for two-way communications, then the communications subsystem 84 includes a receiver 76, a transmitter 74, and a processing module, such as a digital signal processor (DSP) 110. In addition, the communication subsystem 84, configured as a two-way communications device, includes one or more, preferably embedded or internal, antenna elements 50, 51, and local oscillators (LOs) 116. The specific design and implementation of the communication subsystem 84 is dependent upon the communication network in which the mobile device 20 is intended to operate. For example, a device destined for a North American market may include a communication subsystem 84 designed to operate within the Mobitex™ mobile communication system or DataTAC™ mobile communication system, whereas a device intended for use in Europe may incorporate a General Packet Radio Service (GPRS) communication subsystem.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 20 may send and receive communication signals over the communication network 118. Signals received by the antenna 50 through the communication network 118 are input to the receiver 76, which may perform such common receiver functions as signal amplification, frequency down conversion, filtering, channel selection, and analog-to-digital conversion. Analog-to-digital conversion of the received signal allows the DSP to perform more complex communication functions, such as demodulation and decoding. In a similar manner, signals to be transmitted are processed by the DSP 110, and are the input to the transmitter 74 for digital-to-analog conversion, frequency up-conversion, filtering, amplification and transmission over the communication network via the antenna 51.

In addition to processing communication signals, the DSP 110 provides for receiver 76 and transmitter 74 control. For example, gains applied to communication signals in the receiver 76. and transmitter 74 may be adaptively controlled through automatic gain control algorithms implemented in the DSP 110.

In a data communication mode, a received signal, such as a text message or web page download, is processed by the communication subsystem 84 and input to the processing device 82. The received signal is then further processed by the processing device 82 for output to a display 98, or alternatively to some other auxiliary I/O device 88. A device user may also compose data items, such as e-mail messages, using a keyboard 92, such as a QWERTY-style keyboard, and/or some other auxiliary I/O device 88, such as a touch-pad, a rocker switch, a thumb-wheel, or some other type of input device. The composed data items may then be transmitted over the communication network 118 via the communication subsystem 84.

In a voice communication mode, overall operation of the device is substantially similar to the data communication mode, except that received signals are output to a speaker 94, and signals for transmission are generated by a microphone 96. Alternative voice or audio I/O subsystems, such as a voice message recording subsystem, may also be implemented on the device 20. In addition, the display 98 may also be utilized in voice communication mode, for example to display the identity of a calling party, the duration of a voice call, or other voice call related information.

The short-range communications subsystem 86 enables communication between the mobile device 20 and other proximate systems or devices, which need not necessarily be similar devices. For example, the short-range communications subsystem 86 may include an infrared device and associated circuits and components, or a Bluetooth™ communication module to provide for communication with similarly-enabled systems and devices.

This written description uses examples to disclose the invention, including the best mode, and also to enable any person skilled in the art to make and use the invention. The patentable scope of the invention is defined by the claims, and may include other examples that occur to those skilled in the art.

We claim:

1. A system for operating a color flat panel display, comprising:

the color flat panel display having a bottom surface and having a reflector to reflect ambient light for viewing of the color flat panel display, where the color flat panel display has an adjustable color depth;

a light source for emitting light through the bottom surface of the color flat panel display; and a display processing device coupled to the color flat panel display for decreasing the color depth of the color display when the light source is activated and increasing the color depth of the color display when the light source is deactivated;

wherein the color flat panel display is configured to allow more reflection of ambient light than transmission of light emitted from the light source;

wherein the color flat panel display has an adjustable font size, and wherein the display processing device increases the font size of the color flat panel display from a first font size to a second font size when the light source is activated.

2. The system of claim 1, wherein the color depth is decreased substantially toward monochrome when the light source is activated.

3. The system of claim 1, wherein the color depth is decreased to a smaller set of colors when the light source is activated.

4. The system of claim 3, wherein the color depth is decreased to a smaller set of eight colors when the light source is activated.

5. The system of claim 1, further comprising:

a user interface coupled to the light source for activating the light source.

6. The system of claim 5, wherein the user interface is further coupled to the display processing device and includes a low-light mode input to activate the light source and a further input to adjust the color depth of the color.

7. The system of claim 5, wherein the user interface is further coupled to the display processing device includes a reflective mode input to deactivate the light source and a further input to adjust the color depth of the color flat panel display.

8. The system of claim 7, wherein the reflective mode input further decreases the font size of the color flat panel display from the second font size to the first font size.

9. The system of claim 5, wherein the display processing device is one of a microprocessor, a display controller, and a combination the microprocessor and the display controller.

10. The system of claim 1, wherein the color flat panel display is one of a liquid crystal display and a digital paper display.

11. A system for operating a color flat panel display, comprising:

the color flat panel display having a bottom surface and having a reflector to reflect ambient light for viewing of the color flat panel display, where the color flat panel display has an adjustable color depth;

a light source for emitting light through the bottom surface of the color flat panel display; and a display processing device coupled to the color flat panel display for decreasing the color depth of the color display when the light source is activated and increasing the color depth of the color display when the light source is deactivated;

wherein the color flat panel display has an adjustable font size, and wherein the display processing device increases the font size of the color flat panel display from a first font size to a second font size when the light source is activated.

12. The system of claim 11, wherein the color flat panel display is configured to allow more reflection of ambient light than transmission of light emitted from the light source.

13. The system of claim 11, wherein the color depth is decreased substantially toward monochrome when the light source is activated.

14. The system of claim 11, wherein the color depth is decreased to a smaller set of colors when the light source is activated.

15. The system of claim 14, wherein the color depth is decreased to a smaller set of eight colors when the light source is activated.

16. The system of claim 11, further comprising:

a user interface coupled to the light source for activating the light source.

17. The system of claim 16, wherein the user interface is further coupled to the display processing device and includes a low-light mode input to activate the light source and a further input to adjust the color depth of the color.

18. The system of claim 16, wherein the user interface is further coupled to the display processing device includes a reflective mode input to deactivate the light source and a further input to adjust the color depth of the color flat panel display.

19. The system of claim 18, wherein the reflective mode input further decreases the font size of the color flat panel display from the second font size to the first font size.

20. The system of claim 18, wherein the display processing device is one of a microprocessor, a display controller, and a combination the microprocessor and the display controller.

21. The system of claim 11, wherein the color flat panel display is one of a liquid crystal display and a digital paper display.

22. A color liquid crystal display (LCD) module, comprising:

an upper transparent plate having a front polarizer and having a top surface for viewing;

a lower transparent plate having a bottom surface and a rear polarizer;

a liquid crystal layer between the upper transparent plate and the lower transparent plate for adjusting color depth of light passing through the liquid crystal layer;

a color filter for filtering light;

an electroluminescent (EL) light source for emitting light through the bottom surface of the lower transparent plate; and a reflector for reflecting ambient light back through the liquid crystal layer and for passing light from the EL light source;

wherein the liquid crystal decreases the color depth when the EL light source is activated and increases the color depth when the light source is deactivated;

wherein the color depth is decreased to a smaller set of eight colors when the EL light source is activated.

23. The color LCD module of claim 22, wherein the reflector is configured to allow for more reflection of ambient light than the transmission of emitted light from the EL light source.

24. The color LCD module of claim 22, wherein the upper and lower transparent plates are one of glass, plastic, and a combination of glass and plastic.

25. A method of operating a color flat panel display, the color flat panel display having a color depth, having a light source and a reflector, comprising:

receiving input for controlling the light source to one of activate and deactivate;

controlling the light source, in response to the input, to one of activate and deactivate; and decreasing the color depth of the color flat panel display when the light source is activated and increasing the color depth of the color panel display when the light source is deactivated;

increasing font size of content being displayed by the color flat panel display when the light source is activated.

26. The method of claim 25, wherein the color depth is decreased substantially to monochrome in response to the activation of the light source.

27. The method of claim 25, wherein the reflector is configured to allow for more reflection of ambient light than transmission of emitted light from the light source.

28. The method of claim 25, further comprising:

monitoring for a second occurrence of the input and, in response to receiving a second occurrence of the input, further increasing the font size.

29. The method of claim 25, wherein the color depth is decreased to a smaller set of colors when the light source is activated.

30. The method of claim 29, wherein the color depth is decreased to a smaller set of eight colors when the light source is activated.

31. A method of operating a color liquid crystal display (LCD) module, the LCD module comprising an upper transparent plate having a front polarizer and having a top surface for viewing;

a lower transparent plate having a bottom surface and a rear polarizer;

a liquid crystal layer between the upper transparent plate and the lower transparent plate for adjusting color depth of light passing through the liquid crystal layer;

a color filter for filtering light;

an electroluminescent (EL) light source for emitting light through the bottom surface of the lower transparent plate; and a reflector for reflecting ambient light back through the liquid crystal layer 2nd for passing light from the EL light source;

the method comprising decreasing the color depth when the EL light source is activated and increasing the color depth when the EL light source is deactivated;

wherein the color depth is decreased to a smaller set of eight colors when the EL light source is activated.

32. The method of claim 31, wherein the reflector is configured to allow for more reflection of ambient light than the transmission of emitted light from the EL light.

33. The method of claim 31, wherein the upper and lower transparent plates are one of glass, plastic, and a combination of glass and plastic.

34. A system for operating a color flat panel display, comprising:

the color flat panel display having a bottom surface and having a reflector to reflect ambient light for viewing of the color flat panel display, where the color flat panel display has an adjustable color depth;

a light source for emitting light through the bottom surface of the color flat panel display; and a display processing device coupled to the color flat panel display for decreasing the color depth of the color display when the light source is activated and increasing the color depth of the color display when the light source is deactivated, a user interface coupled to the light source for activating the light source wherein the color flat panel display is configured to allow more reflection of ambient light than transmission of light emitted from the light source;

wherein the user interface is further coupled to the display processing device and includes a low-light mode input to activate the light source and a further input to adjust the color depth of the color;

wherein the low-light mode input further increases the font size of the color flat panel display from a first font size to a second font size.

35. The system of claim 34, wherein the color depth is decreased substantially toward monochrome when the light source is activated.

36. The system of claim 34, wherein the color depth is decreased to a smaller set of colors when the light source is activated.

37. The system of claim 36, wherein the color depth is decreased to a smaller set of eight colors when the light source is activated.

38. The system of claim 34, wherein the user interface is further coupled to the display processing device includes a reflective mode input to deactivate the light source and a further input to adjust the color depth of the color flat panel display.

39. The system of claim 38, wherein the reflective mode input further decreases the font size of the color flat panel display from the second font size to the first font size.

40. The system of 34, wherein a second occurrence of the low-light mode input increases the font size of the color flat panel display from the second font size to a third font size.

41. The system of claim 34, wherein the display processing device is one of a microprocessor, a display controller, and a combination the microprocessor and the display controller.

42. The system of claim 34, wherein the color flat panel display is one of a liquid crystal display and a digital paper display.

43. A system for operating a color flat panel display, comprising:

the color flat panel display having a bottom surface and having a reflector to reflect ambient light for viewing of the color flat panel display, where the color flat panel display has an adjustable color depth;

a light source for emitting light through the bottom surface of the color flat panel display; and a display processing device coupled to the color flat panel display for decreasing the color depth of the color display when the light source is activated and increasing the color depth of the color display when the light source is deactivated, a user interface coupled to the light source for activating the light source wherein the user interface is further coupled to the display processing device and includes a low-light mode input to activate the light source and a further input to adjust the color depth of the color;

wherein the low-light mode input further increases the font size of the color flat panel display from a first font size to a second font size.

44. The system of claim 43, wherein the color depth is decreased substantially toward monochrome when the light source is activated.

45. The system of claim 43, wherein the color depth is decreased to a smaller set of colors when the light source is activated.

46. The system of claim 45, wherein the color depth is decreased to a smaller set of eight colors when the light source is activated.

47. The system of claim 43, wherein the user interface is further coupled to the display processing device includes a reflective mode input to deactivate the light source and a further input to adjust the color depth of the color flat panel display.

48. The system of claim 47, wherein the reflective mode input further decreases the font size of the color flat panel display from the second font size to the first font size.

49. The system of 43, wherein a second occurrence of the low-light mode input increases the font size of the color flat panel display from the second font size to a third font size.

50. The system of claim 43, wherein the display processing device is one of a microprocessor, a display controller, and a combination the microprocessor and the display controller.

51. The system of claim 43, wherein the color flat panel display is one of a liquid crystal display and a digital paper display.

* * * * *

UNITED STATES PATENT AND TRADEMARK OFFICE
CERTIFICATE OF CORRECTION

PATENT NO. : 6,967,657 B2
APPLICATION NO. : 10/146075
DATED : November 22, 2005
INVENTOR(S) : Lowles et al.

It is certified that error appears in the above-identified patent and that said Letters Patent is hereby corrected as shown below:

Column 9, line 58, please insert -- claim -- between “of” and “34”

Column 10, line 48, please insert -- claim -- between “of” and “43”

Signed and Sealed this

Fifth Day of December, 2006

JON W. DUDAS
*Director of the United States Patent and Trademark Office*